Aug. 22, 1939.    J. C. DOMINGUEZ    2,170,366
ROTARY INTERNAL COMBUSTION MOTOR
Filed June 2, 1937    3 Sheets-Sheet 1

Julio C. Dominguez
INVENTOR
BY Victor J. Evans & Co.
ATTORNEYS

Aug. 22, 1939.  J. C. DOMINGUEZ  2,170,366

ROTARY INTERNAL COMBUSTION MOTOR

Filed June 2, 1937   3 Sheets-Sheet 2

Julio C. Dominguez INVENTOR by Victor J. Evans & Co.

ATTORNEYS

Aug. 22, 1939.   J. C. DOMINGUEZ   2,170,366
ROTARY INTERNAL COMBUSTION MOTOR
Filed June 2, 1937   3 Sheets-Sheet 3

Julio C. Dominguez
INVENTOR
BY Victor J. Evans & Co.
ATTORNEYS

Patented Aug. 22, 1939

2,170,366

UNITED STATES PATENT OFFICE 2,170,366

ROTARY INTERNAL COMBUSTION MOTOR

Julio Correa Dominguez, Tocopilla, Chile

Application June 2, 1937, Serial No. 146,081

1 Claim. (Cl. 123—14)

This invention relates to internal combustion engines of the rotary type including a stator and a rotor and has for the primary object the provision of means, whereby the rotor will receive multiple power impulses during each complete revolution thereof so that maximum power will be developed by the device and which also includes means for thoroughly scavenging the spent gases and simultaneously cooling the device.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating a rotary internal combustion engine constructed in accordance with my invention.

Figure 1:
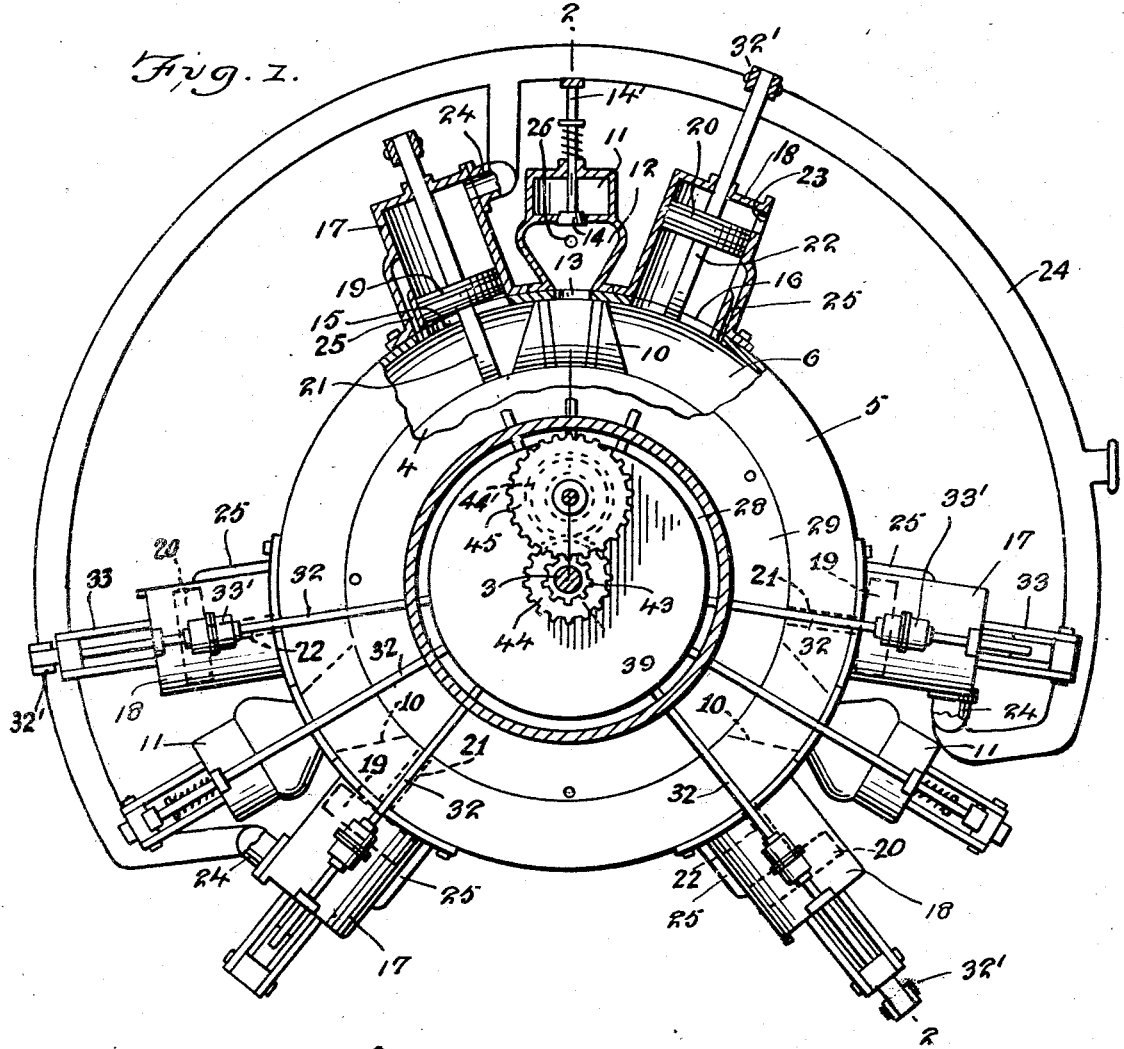
Figure 4:
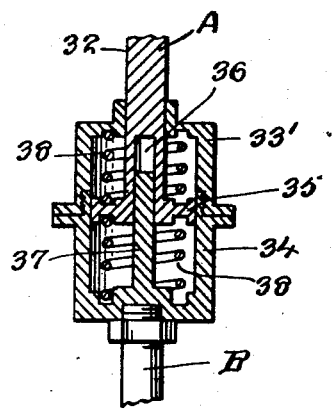
Figure 4 is a detail vertical sectional view illustrating a cushioning device for the valve mechanism.
Figure 2:
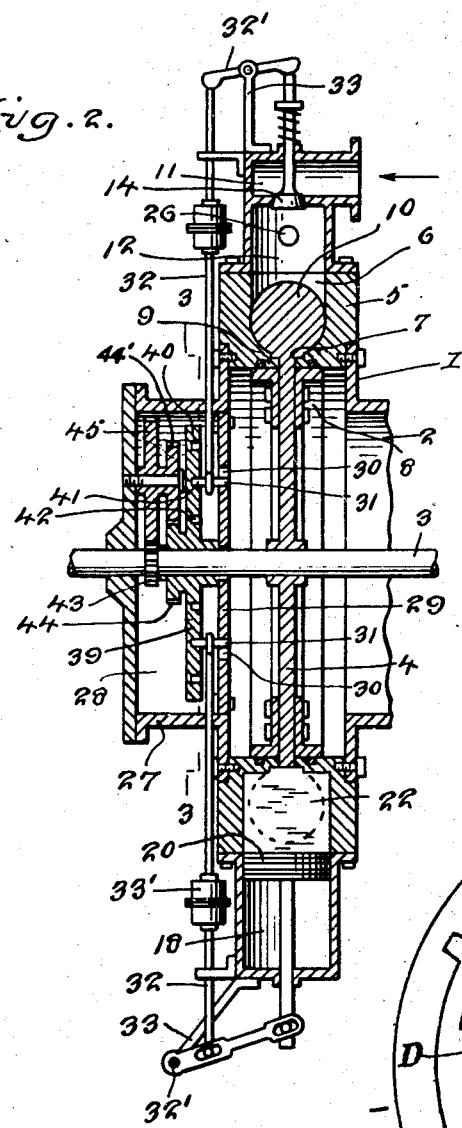
Figure 2 is a transverse sectional view taken on the line 2—2 of Figure 1.
Figure 3:
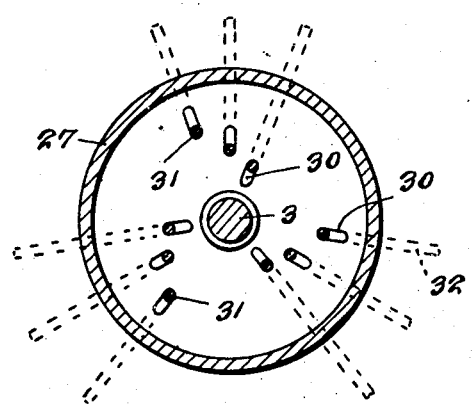
Figure 3 is a detail sectional view taken on the line 3—3 of Figure 2.

Referring in detail to the drawings, the numeral 1 indicates a stator-housing including a support 2 which in this instance is of hollow formation to receive a power takeoff shaft 3 and on which is secured a rotor 4. The stator housing 1 has mounted thereon an annular stator element 5 cooperating with the housing 1 in completing the stator. The element 5 has formed therein an annular cylinder 6 opening outwardly through the inner face of the element 5 in the form of a slot 7 through which the rotor 4 extends to enter the cylinder 6. The rotor includes annular plates 8 abutting the inner face of the stator element 5 and on which stator element are formed ribs 9 fitting in grooves formed in the rotor at opposite sides thereof. The plates 8 and ribs 9 fitting in the grooves of the rotor 4 effect a seal between the stator and the rotor.

Spaced pistons 10 are formed on the rotor and operate in the cylinder 6. In the present showing three pistons are provided equally spaced from one another. However, additional pistons 10 can be provided on the rotor without departing from the spirit and scope of this invention. The pistons have a comparatively tight fit with the walls of the cylinder to prevent leakage.

Mounted on the stator at equal distance apart are combined intake value housings and firing chambers indicated by the characters 11 and 12. The firing chambers 12 are in communication with the cylinder by ports 13 and communicate with the intake manifolds 11 by ports controlled by intake valves 14. The valves 14 are seated by spring 14', and are opened by a valve mechanism which will be hereinafter more fully described. Arranged adjacent each port 13 are ports 15 and 16 closed by cylinder-like housings 17 and 18 and in which are reciprocally mounted piston-like valves 19 and 20, the stems of which extend exteriorly of said valve-like housings and are connected to the valve mechanism. Secured to the piston-like valves 19 and 20 are gates or abutments 21 and 22 adapted to move into and out of the cylinder 6. Ports 23 are provided in the valve-like housings 17 and 18 and the ports 23 of the housing 17 have connected thereto an exhaust manifold 24. The manifold 24 of the valve housings 17 is for the purpose of exhausting spent gases while the ports 23 of the valve housings 18 are for the purpose of admitting to the cylinder 6 atmospheric air. The valve housings also are provided with bypasses 25 communicating with said valve housings and with the cylinder 6. The piston-like valves 19 and 20 when in one of their positions close the bypasses 25 to the ports 23 and when in another position open the bypasses 25 to the ports 23. The gates 21 and 22 must move inwardly and outwardly of the cylinder 6 during the rotation of the rotor to permit the passing of the abutments 10. The firing chambers 12 are provided with spark plugs 26 or similar ignition mediums forming part of an ignition system (not shown).

The stator housing 1 is provided with an extension 27 forming a timing gear chamber 28. The extension 27 provides a journal for the power takeoff shaft 3. The chamber 28 is separated from the interior of the stator housing 1 by a plate 29 having groups of slots 30 acting as guides for cam engaging elements 31 and which are connected to push rods 32. The push rods are connected to rocker arms 32' pivoted on brackets 33. The rocker arms connect with the stems of the valves 14, 19 and 20. Each push rod 32 is of sectional formation, the sections being indicated by the characters A and B. The sections A and B are yieldably connected by a cushioning device 33' consisting of a housing 34 secured to the section B and slidably receiving the section A, the latter having formed thereon a head 35. The section A has a guide socket 36 receiving a guide 37 formed on the housing 34. Coil springs 38 are interposed between the head 35 and the ends of the housing 34. The springs thus mounted provide a yieldable drive between the sections A and B for the purpose of absorbing shocks which may occur in the valve mechanism.

A cam disc 39 is secured to the power takeoff shaft 3 and is located in the timing gear chamber 28 and has formed therein cam grooves 40, 41 and 42. Said cam grooves each have high and low portions indicated by the characters C and D. The cam engaging elements 31 of the valves 14 operate in the cam groove 41, the cam engaging elements of the valves 19 operate in the cam groove 40, and the cam engaging elements 31 of the valves 20 operate in the cam groove 42. Integral with the cam disc 39 is a gear 44 and which is connected to a gear 43 secured on the power takeoff shaft by speed reducing gears 44' and 45.

Figure 5:
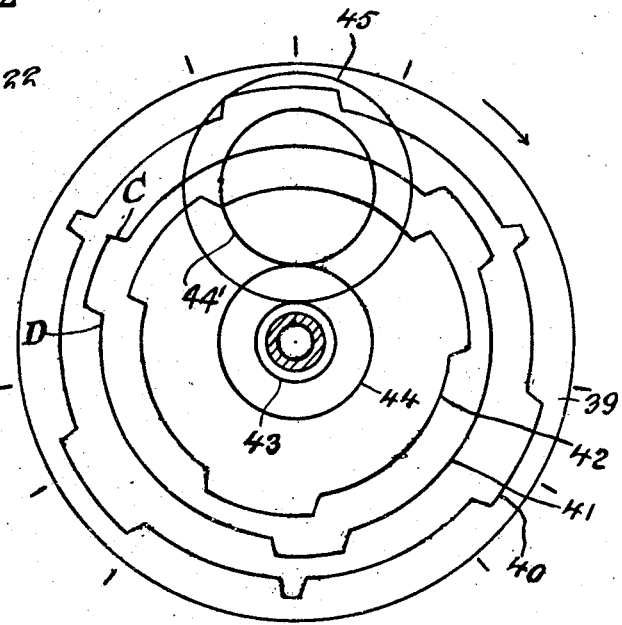
Figure 5 is a diagrammatical view illustrating the cams for controlling the valves of the engine.
Figure 6:
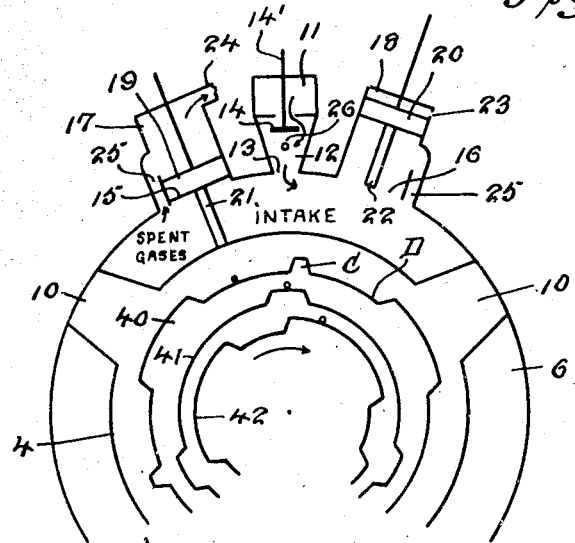
Figure 6 is a fragmentary diagrammatical view showing the fuel intake and exhaust cycle of operation.
Figure 7:
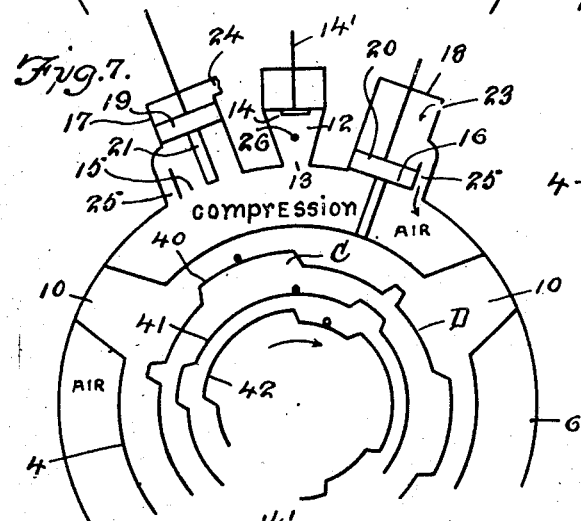
Figure 7 is a fragmentary diagrammatical view showing the fuel compression and cooling cycle of operation.
Figure 8:
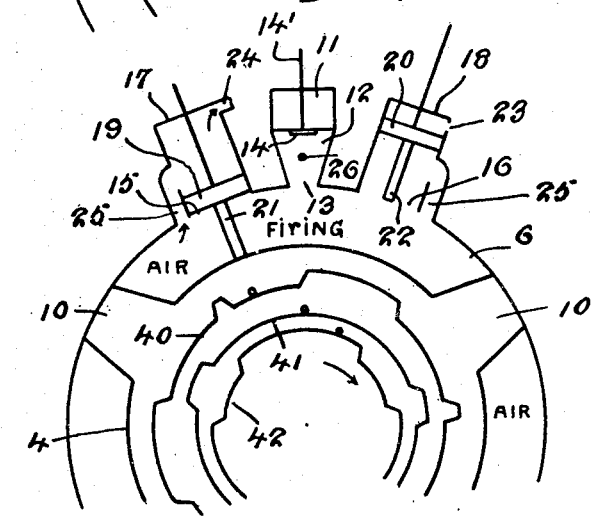
Figure 8 is a fragmentary diagrammatical view showing the compressed fuel firing and the air cooling exhaust cycle of operation.
Figure 9:
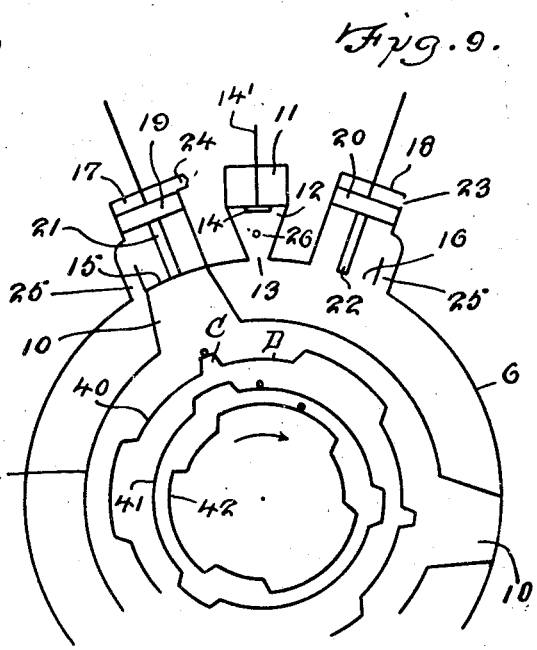
Figure 9 is a fragmentary diagrammatical view showing one of the pistons passing the abutment of the exhaust valve.

The cam groove 40 times the operation of the valve-like pistons 19, the cam groove 41 times the actuation of the intake valves 14 and the cam groove 42 times the action of the piston-like valves 20. By referring to Figure 5, it will be seen that the high and low faces C and D of the cam grooves are such as to bring about operation of the valves heretofore referred to for the producing of three power impulses to each complete revolution of the rotor and with the power impulses acting on all the pistons simultaneously. The cam grooves acting in combination with the valves bring about the various events of the cycle of operation in this engine and which will be now described in detail.

Each time the pistons move from one firing chamber to the next, two events occur. A cycle of operation occurs so that when each piston makes a complete revolution six events have occurred. During the first third of the cycle fuel is drawn into the cylinder 6 from the firing chambers in rear of the pistons and spent gases in advance of the pistons are scavenged from the cylinder 6. During the second third of the cycle and the pistons moving from one firing chamber to the next, the fuel taken in is compressed in advance of the pistons, the gates 22 having moved into the cylinder 6, in rear of the pistons so that said pistons draw in atmospheric air for cooling the cylinder 6 and preventing vacuum from being developed in rear of the pistons. During the final third of the cycle the compressed fuel is fired as the pistons pass their respective firing chambers so that the expanding gases act on the pistons to drive the rotor and at this time the gates 22 are open and the gates 21 are closed or moved into the cylinder 6. The fresh air drawn into the cylinder 6 is scavenged therefrom by the pistons being advanced by the expanding gases. The cooling air escapes by way of the bypasses 25 and ports 23 of the valve housings 17. Thus it will be seen that the six events of the cycle have been completed and that the rotor has made one complete revolution and has during this time received multiple power impulses with the power impulses occurring simultaneously, the high and low faces C and D of the cam grooves 40 and 42 being so arranged that the gates and valve-like pistons open and close at proper times to permit passing of the pistons and also bringing about the closing and opening of the gates 21 and 22 at proper time for the compressing of the fuel, the admittance of cooling air from the atmosphere and the scavenging of such air. It will be seen that when the gates 22 enter the cylinder 6 the bypasses 25 and ports 23 of the valve housing 18 are in communication thereby permitting the pistons to draw atmospheric air into the cylinder 6. As before stated, the atmospheric or cooling air and also the spent gases exhaust from the cylinder 6 by way of the bypasses 25 and ports 23 of the valve housing 17, the gates 21 at this time being disposed in the cylinder 6 positioning the piston-like valve elements 19 inwardly of the outer ends of the bypasses. The high and low faces C and D of the cam groove 41 bring about proper timing of the valves 14 so that fuel will enter the firing chambers on the suction movements of the pistons and that the valves 14 during other cycles of operation remain closed closing the intake ports to the firing chambers.

What is claimed is:

A rotary internal combustion engine comprising a stator including a piston chamber, a rotor operating in said stator, pistons on said rotor and operating in the chamber, combined fuel intake and firing chambers in communication with said piston chamber, ignition means in said combined fuel intake and firing chambers, valves for controlling said combined fuel intake and firing chambers, exhaust and air valve housings in communication with the piston chamber adjacent the combined fuel intake and firing chambers and each having a port open to the atmosphere and a bypass communicating with the piston chamber, valves operating in said housings for opening and closing the bypasses to said ports and closing said housings to said piston chamber, abutments carried by the latter-named valves for movement into and out of the piston chamber, and a timing means driven by said rotor for actuating and timing said valves whereby during one-third of the cycle of operation the pistons draw fuel from said fuel intake and firing chambers into the piston chamber in rear of said pistons and simultaneously said pistons scavenge exhaust gases from in advance thereof to the atmosphere by way of the bypasses and the ports of the exhaust housings and during the second third of the cycle of operation to compress the fuel between the pistons and the abutments of the valves of the air housings and simultaneously draw into the piston chamber cooling air in rear of said pistons by way of the bypasses and ports of the air housings and during the last third of the cycle to fire and expand the compressed fuel for driving the pistons and simultaneously exhaust to the atmosphere the cooling air by way of the bypasses and the ports of the exhaust housings.

JULIO CORREA DOMINGUEZ.